S. W. MANN.
RESURFACING MACHINE.
APPLICATION FILED MAR. 10, 1917.
1,276,092.
Patented Aug. 20, 1918.
3 SHEETS—SHEET 1.
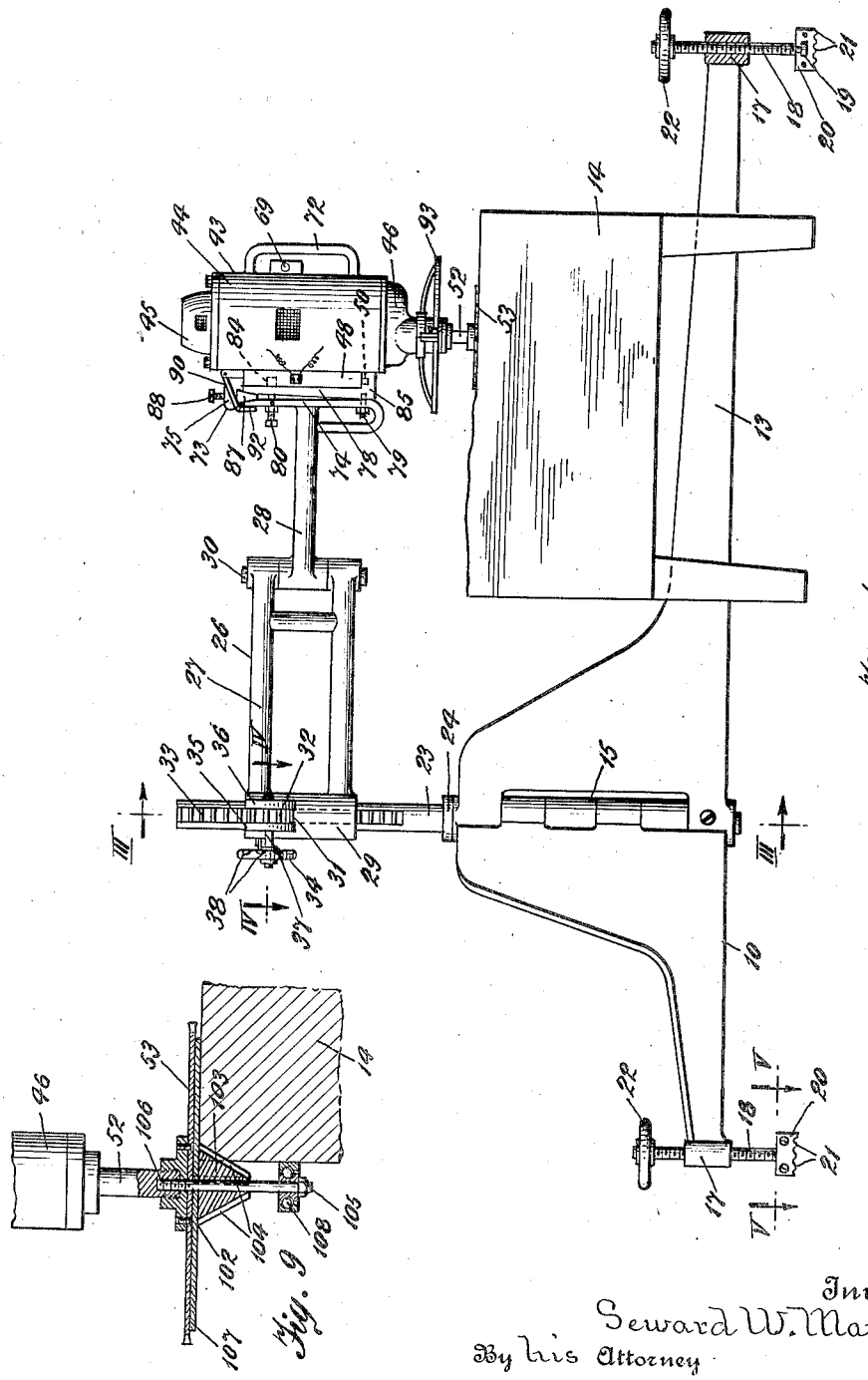
Inventor
Seward W. Mann
By his Attorney

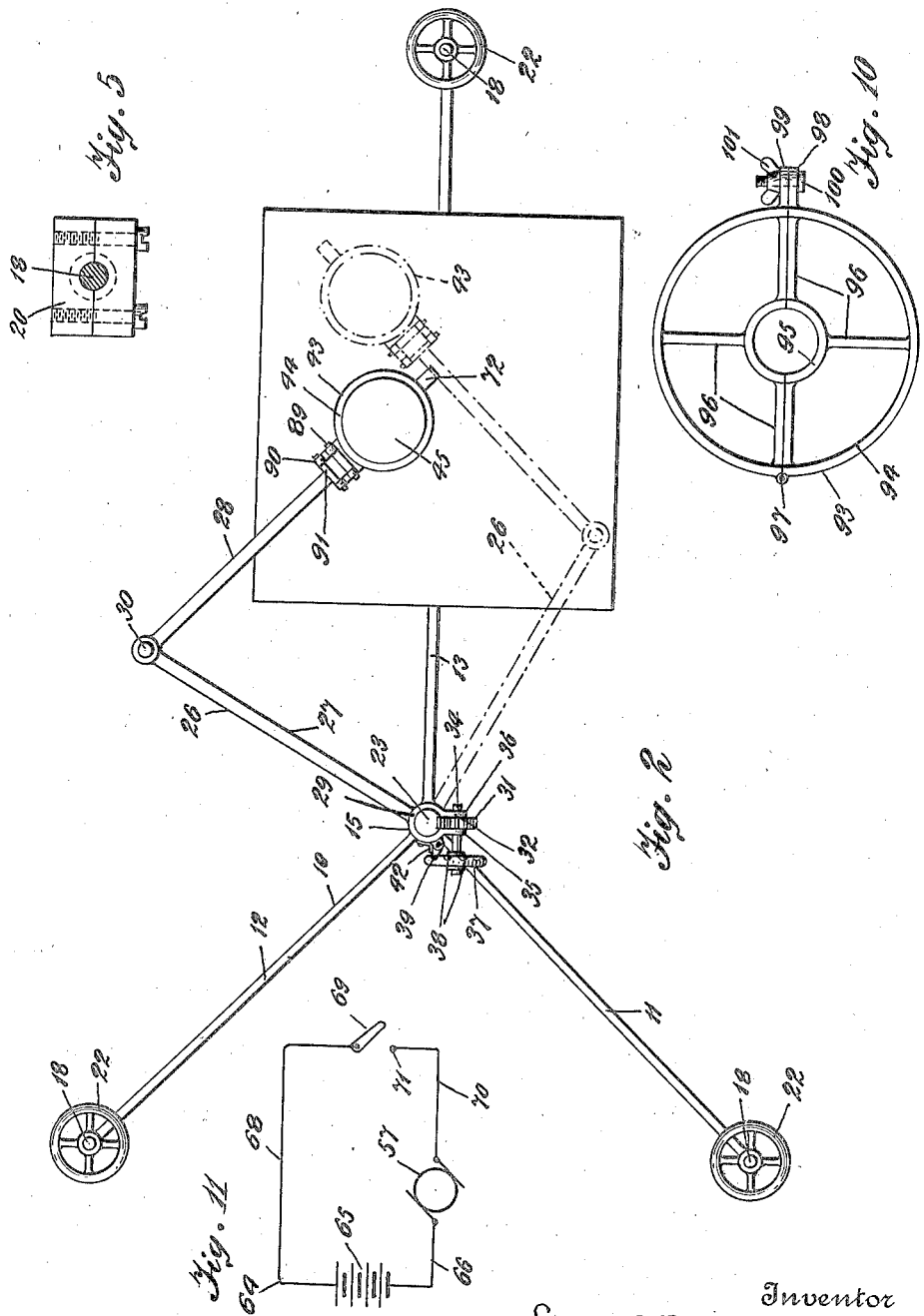

S. W. MANN.
RESURFACING MACHINE.
APPLICATION FILED MAR. 10, 1917.
1,276,092.
Patented Aug. 20, 1918.
3 SHEETS—SHEET 3.
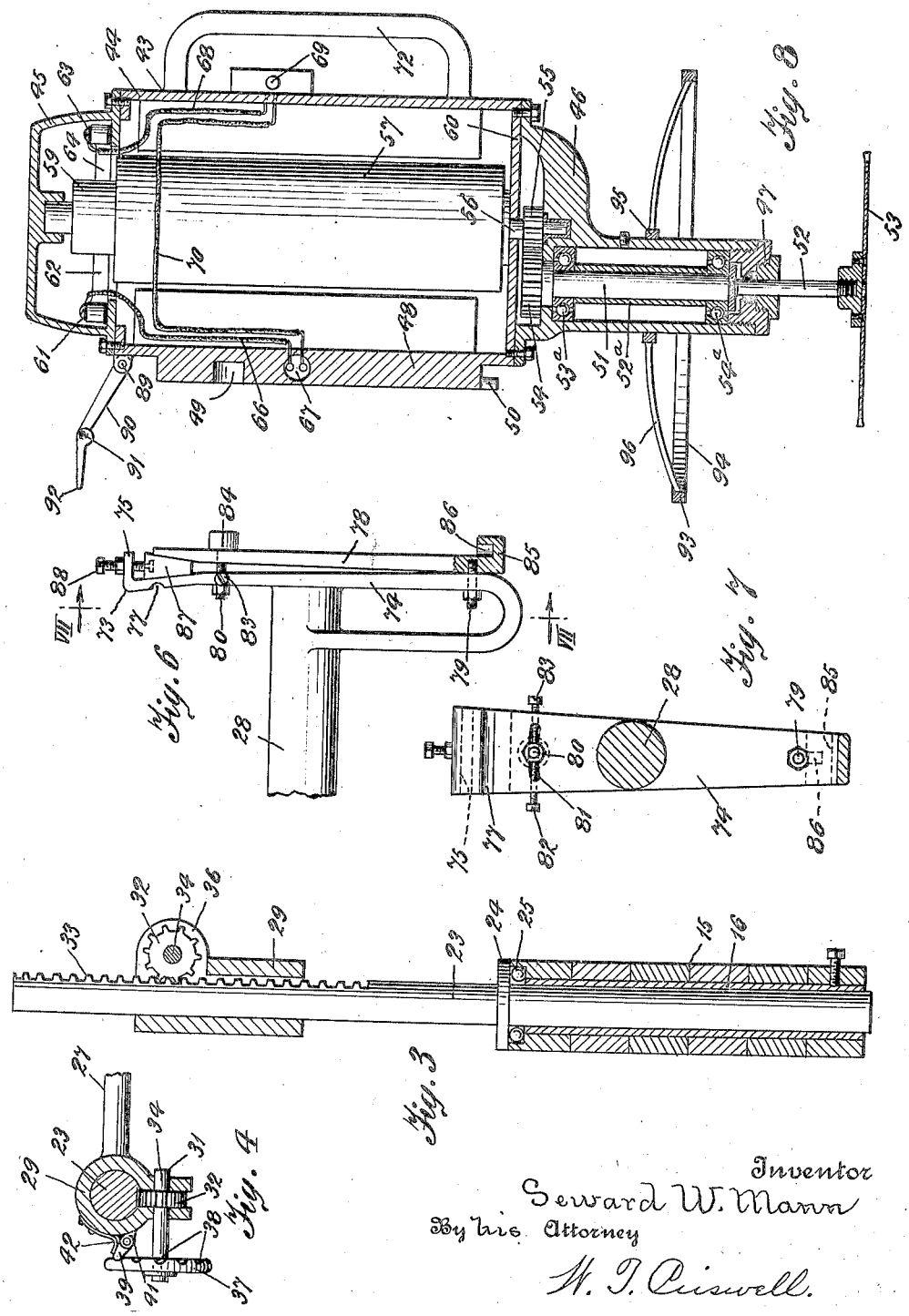
Inventor
Seward W. Mann
By his Attorney
W. T. Criswell.

UNITED STATES PATENT OFFICE.

SEWARD W. MANN, OF NEW YORK, N. Y.

RESURFACING-MACHINE.

1,276,092.

Specification of Letters Patent. Patented Aug. 20, 1918.

Application filed March 10, 1917. Serial No. 154,015.

*To all whom it may concern:*

Be it known that I, SEWARD W. MANN, a citizen of the United States, and a resident of New York, county and State of New York, have invented a certain new and useful Improvement in Resurfacing-Machines, of which the following is a full, clear, and exact specification.

This invention relates to a class of apparatus adapted to be used for retrimming and dressing cutting blocks.

My invention has for its object the provision of a machine adapted to be employed for resurfacing wooden blocks commonly used in butcher shops and elsewhere for permitting meat and other articles to be conveniently cut, and which after a comparatively short period of use become so irregular and uneven as to be impractical for proper utilization, the machine being efficiently and durably constructed in a manner to allow its parts to be easily assembled and disassembled for being portable from one place to another. The invention consists essentially of a frame adjustable upwardly and downwardly to various angles, and on this frame is a longitudinally disposed jointed arm adapted to be swung circumferentially as well as being adjustable upwardly and downwardly. Removably mounted on the extensible arm is a casing, and in the casing is a power driven vertical shaft for rotatbly driving a saw so as to cut a block on a longitudinal plane.

Other objects of the invention are to provide means for permitting the jointed arm to be raised and lowered relative to the frame; to provide means whereby the casing with its shaft may be adjusted on inclines vertically with respect to the jointed arm; to provide a fender for preventing accidental contact with the saw; and to provide a cutter adapted to be removably mounted on the shaft of the saw for beveling the edge of a block.

A practical embodiment of the invention is represented in the accompanying drawings forming a part of this specification in which similar characters of reference indicate corresponding parts in all the views, the said invention being more fully described hereinafter, and then pointed out in the claims at the end of the description.

In the drawings, Figure 1 is a side elevation of one form of machine embodying my invention showing the manner of its use for refacing a cutting block.

Fig. 2 is a top plan of the machine and the block.

Fig. 3 is an enlarged detail sectional view taken on the line III—III of Fig. 1.

Fig. 4 is an enlarged detail sectional view, partly fragmentary, taken on the line IV—IV of Fig. 1.

Fig. 5 is an enlarged detail sectional view taken on the line V—V of Fig. 1.

Fig. 6 is a fragmentary view showing a side elevation, partly broken away, of the means for adjusting on an incline the casing and saw used in the machine.

Fig. 7 is an enlarged detail sectional view taken on the line VII—VII of Fig. 6.

Fig. 8 is an enlarged detail longitudinal vertical sectional view taken through the casing with the saw and fender used in the machine.

Fig. 9 is a fragmentary view showing a detail sectional view taken through the cutter employed for beveling the edge of a block.

Fig. 10 is a top plan of the fender employed on the machine, and

Fig. 11 is a diagrammatic view of the electric circuit for operating the motor employed in the device.

The machine has a frame 10 composed preferably of three wings, as 11, 12, 13, and the latter wing may be considerably longer than the other wings so as to be removably disposed under a wooden block, as 14, of a form ordinarily employed by butchers for cutting meat thereon, though the machine may also be used for dressing and trimming other types of blocks on which various articles are cut. One of the corresponding ends of the wings of the frame 10 are hinged together, as at 15, by providing interfitting registered tubular lugs which are revoluble on a sleeve 16 disposed in the passage of the lugs. The sleeve 16 is fixed to the lugs of the wing 13 so that the other wings of the frame may be swung toward and from each other as well as swung toward and from the wing 13, and serving to allow the wings to be separately adjusted upwardly and downwardly for leveling, and inclining the frame on the free end of each wing is an interiorly threaded vertical sleeve 17. Screwed in each of these sleeves is a threaded bolt 18, and all of the bolts are of lengths so as to protrude above and below the sleeves. Rotatable on the lower end by means of a toggle joint, as 19, of each of the bolts 18 is a substantially rectangular block 20 with teeth, as 21, projecting from its underside, and on the upper end of each bolt is a handle 22 preferably in the form of a wheel. By turning the handles 22 to rotate the bolts 18 accordingly each or all of the wings of the frame may be raised or lowered the required height for leveling the machine, or arranging it on a suitable incline.

Rotatable in the sleeve 16 of the wings of the frame is a vertical shaft 23 of a length so that its upper end extends considerable distance above the frame and above the cutting block 14. On the central part of this shaft is a fixed disk 24 which movably rests on top of the hinged parts 15 of the wings of the frame, and to allow the shaft to be freely revolved in the frame an antifriction bearing, as 25, is provided in a recess in the top of the hinged part of the frame under the disk 24.

On the upper extending end of the shaft 23 is a longitudinally disposed arm 26 adapted to be swung circumferentially over the frame 10 as well as over the cutting block, and this arm is composed of sections, as 27 and 28. The section 27 of the arm may be formed of two spaced bars, as shown, and on one of the corresponding ends of these bars is a sleeve 29 movably arranged on the shaft 23. Between the second ends of the bars of the section 27 of the arm is pivoted, at 30, one end of the section 28, and serving to allow the jointed arm 26 to be releasably held in raised and lowered positions on the shaft 23 at suitable heights above the frame 10 as well as above the cutting block, an adjusting device 31 is provided.

The adjusting device 31 preferably consists of a toothed wheel 32 which meshes with a rack 33 provided on the upper part of the shaft 23, and this toothed wheel is held on a stud 34 journaled in two spaced lugs 35 and 36 projecting laterally from the sleeve 29 of the section 27 of the jointed arm. The stud 34 is of a length so that one of its ends extends somewhat beyond the periphery of the sleeve 29, and on this extending end of the stud is a wheel 37 serving as a handle to permit the stud with the toothed wheel to be manually revolved. In the edge of the wheel 37 opposed to the sleeve 29 of the arm 26 are a number of spaced notches, as 38, which are engaged by one end of a pawl, as 39, having its central part pivoted to a lug 41 protruding from the sleeve of the arm 26, and this pawl is normally held releasably in engagement with the notches of the wheel by a spring, as 42, arranged so that one of its ends is secured to the sleeve of the arm 26 while its other end movably abuts against the pawl. When the handle, or wheel 37 is turned from right to left the pawl 39 will be moved against the tension of the spring 42 out of engagement with the notch 38 in which it is seated, and the stud 34 with the toothed wheel 32 will be rotated to adjust the jointed arm 26 downwardly on the shaft 23 toward the frame 10 and toward the block 14. When the jointed arm has been adjusted at a suitable height the tension of the spring will cause the pawl to engage the proper notch of the wheel 37 for releasably preventing the jointed arm against accidental movement on the shaft 23, and to reversely adjust the jointed arm on the shaft 23 the pawl is manually released from the wheel 37 which in turn is rotated from left to right. The stud 34 and the toothed wheel 32 will then be likewise reversely turned for adjusting the jointed arm upwardly on the shaft 23.

Removably mounted on the jointed swinging arm 26 is a casing 43 formed with preferably a cylindrical wall 44 having open upper and lower ends, and the upper end of the casing is closed by a cap, as 45, while on the lower open end of the casing is a tubular extension, as 46. The casing 43 is vertically disposed so that the lower end of its extension 46 will be in opposed relation to the top of a cutting block, and the lower end of this extension is interiorly threaded with a threaded tubular bushing, or bearing, as 47, being threaded therein. Projecting laterally from the wall 44 of the casing 43 is an enlarged part 48 having in its upper part a recess 49, while extending downwardly from the lower end of the enlarged part is a circular lug 50. Interiorly of the tubular extension 46 of this casing is a vertically disposed drive shaft 51 of a shorter length than the extension, and on the shaft may be a fixed sleeve 52$^a$ having its ends journaled in antifriction bearings 53$^a$ and 54$^a$ to allow the shaft with its sleeve to be freely driven. In the lower end of the shaft 51 is a threaded recess, not shown, and in this recess is screwed the upper threaded end of a shaft, or stud 52 which is journaled in the bearing 47 of the extension 46 of the casing 43. The stud 52 protrudes some distance below the extension 46, and the lower end of the stud is threaded with a circular saw 53 removably mounted thereon for being driven so as to cut the block on a longitudinal plane for trimming off a desired part of its top surface. On the upper end of the drive shaft 51 within the extension 46 of the casing 43 is a gear 54 in mesh with a pinion 55 provided on one end of the drive shaft 56 of an electric motor, as 57, which is carried in the casing for driving the shaft 51, stud 52 and the saw 53 though these parts may be driven by any other desired means. The motor 57 may be of any desired type having on the drive shaft an armature 59. The lower end of the shaft 56 of the motor is journaled in part of the extension 46 of the casing 43 as well as being journaled in a plate 60 which is secured in the lower end of the casing on top of its extension. The upper end of the shaft of the motor is journaled in the cap 45 of the casing above the armature 59, and extending from a post 61 arranged in the cap is a brush 62 yieldingly contacting with the armature of the motor while extending from a post 63 provided in an opposite part of the cap of the casing is a second brush 64 also in yielding contact with the armature. The motor 57 may be driven by an electric circuit, as 64, leading from any suitable source of supply, for example a battery 65, from one terminal of which is a wire 66 leading through an opening 67 in the enlarged part of the casing 43 into the interior of the casing and thence to the post 61 of the brush 62. Connected to the post 63 of the brush 64 is one end of a wire 68 which leads to one pole of a switch, as 69, preferably in the form of an ordinary push button type arranged on part of the casing opposite to its enlarged part. From the second terminal of the battery 65 is a wire 70 passing also through the opening 67 of the enlarged part of the casing, and this wire leads to the second pole 71 of the switch 69 so that when the switch is operated to contact with the pole 71 the circuit will be closed from the battery over the wire 66, through the brush 62 through the armature and through the motor, through the brush 64 and post 63, and over the wire 68 to one pole of the switch 69. Also from the battery the circuit will pass over the wire 70 to the second pole of the switch as well as through the switch, and the motor will then be energized for driving the shaft 51, stud 52 and the saw 53. Extending from the casing 43 is a handle 72 which is adjacent to the switch 69 to allow the switch to be conveniently operated for closing and opening the circuit 64 during the guiding of the casing and the guiding of the saw 53. To permit the casing to be removably mounted on the jointed arm 26 as well as to allow the casing with the saw to be disposed on inclines vertically, an adjustable retainer, as 73, is provided.

The adjustable retainer 73 may be composed of a vertical bar 74 provided on the free end of the section 28 of the jointed arm 26, and this bar is of a length to extend considerable distances above and below the arm, while the lower part of the bar may be curved and turned upwardly in spaced relation to the bar proper as well as being formed on the section 28 of the arm 26. The upper part of the bar 74 is bent outwardly from the section 28 of the arm 26 to provide an angularly projecting finger 75 with a threaded opening therethrough, and in this bar adjacent to this finger is a transverse notch, as 77. The lengthwise face of the bar 74 is flat besides being preferably slightly tapered upwardly, and on the tapered face of this bar is movably mounted a second bar, as 78. The bar 78 is of a length so as to extend from the lower curved end of the bar 74 to a distance slightly above the notch 77 of the bar 74, and the face of the upper end of this bar is tapered oppositely to the taper of the first bar. The lower end of the second bar 78 is adjustably fastened to the lower curved end of the fixed bar 74 by a threaded bolt, as 79, which is screwed through registered threaded openings in these bars, and the upper end of the second bar is adjustably attached to the bar 74 by another threaded bolt 80 passed through a transverse slot 81 in the bar 74 as well as being screwed in a threaded recess in the upper end of the second bar. By screwing the bolts 79 and 80 accordingly inwardly and outwardly of their openings the bar 78 may be positioned on a vertical line, or on slight inclines forwardly and backwardly as well as in lateral directions relative to the bar 74 and also relative to the swinging jointed arm 76, and when suitably adjusted the second bar may be held against accidental movement by set screws 82 and 83 which are threaded through openings in opposite parts of the bar to communicate with the slot 81 so that when these screws are guided inwardly of the bar they will clamp the bolt 80 therebetween to prevent lateral movement of the second bar. Projecting from the upper part of the second bar 78 is a lug, or pin 84 adapted to be removably seated in the recess 49 of the enlarged part 48 of the casing 43, while projecting from the lower end of the second adjustable bar is a lug 85 with a recess 86 in its upper part for removable reception of the lug 50 of the enlarged part of the casing. When the bar 78 is adjusted in a suitable position on the bar 74 a tapered block, or wedge, as 87, is adjustably arranged between the tapered upper ends of these bars, and the upper end of this wedge is rotatably held by means of a toggle joint on the lower end of a threaded bolt, or set screw 88 which is screwed through the threaded opening in the finger 75 of the bar 72 so that by rotating this set screw the wedge 87 may be driven downwardly between the bars 74 and 78 to hold them in suitable spaced relation. To mount the casing 43 with its motor and the saw 53 on the jointed arm 26 the lug 50 is disposed in the recess 86 of the lug 85 of the bar 78, and the lug 84 is arranged in the recess 49 of the enlarged part of the casing. In order to releasably lock the casing to the retainer 73, between two lugs projecting from the upper end of the casing is pivoted, at 89, one end of a strap, as 90, which is preferably composed of two spaced bars, and these bars are of lengths so as to be swung over the upper end of the fixed bar 74 of the jointed arm 26. Rotatable in the second ends of the bars of the strap 90 is a cross-rod 91 adapted to be removably seated in the notch 77 of the bar 74, and on this rod is held one end of a handle, as 92, for allowing the strap to be swung to and from over the upper end of the bar as well as to permit the rod 91 to be forced into and out of the notch.

The casing 43 when adjustably mounted in this manner on the jointed arm 26 for disposing the saw 53 to be revolved on a true longitudinal plane or on a suitable incline may then be manually guided by means of the handle 72. When the circuit 64 is closed by operating the switch 69, as above explained, for revolving the saw 53 the top of the block 14, as shown in Fig. 1, may be leveled and trimmed by cutting off a required portion thereof after the arm 26 has been suitably adjusted on the shaft 23, also as hereinbefore explained, the jointed arm 26 being movable backwardly and forwardly as well as circumferentially will permit, the saw being guided in any desired direction.

In order to prevent the person operating the machine from being injured by the saw on the tubular extension 46 of the casing 43 is provided a guard 93. The guard 93 is preferably constructed of an outer ring 94 of a diameter considerably larger than the diameter of the saw, and within the outer ring is an inner ring 95, of a diameter so as to fit snugly on the tubular extension 46 of the casing 43. Both of these rings are composed of two separate halves, the halves of the inner rings are connected to the halves of the outer rings by a number of cross-bars, as 96. One of the corresponding ends of the halves of the guard are hinged together, at 97, to allow the sections to be swung to and from each other, and extending laterally from the second ends of the halves are two contacting lugs 98 and 99 with registered openings therethrough. In these openings is a bolt 100 with a threaded end protruding beyond the lugs, and on this threaded end is a finger nut 101 adapted to be screwed into contact with the lugs for releasably fastening the halves of the guard together. By unscrewing the nut 101 from the bolt 100, one of the halves of the guard may be swung from the other half, and the guard may then be removed from or applied to the tubular extension of the casing 43 so as to be positioned at a suitable distance above the saw 53 to prevent the arm of the person operating the machine from contacting with the saw.

Serving to allow the edge of the cutting block to be beveled, if desired, following being refaced, I provide a cutter, as 102 Fig. 9. The cutter 102 may consist of an inverted cone-shape, or downwardly tapered circular block, or body, as 103, and extending at suitable spaced intervals from the periphery of this body are a number of cutting blades 104 all disposed on inclines for beveling the edge of the cutting block at the desired angle. This body of the cutter with its blades 104 is fixed on a rod 105 of a length so that its lower end protrudes some distance below the apex of the body, while the other end of the rod extends some distance above the body, and this upper end of the rod is threaded, at 106. Also on the rod 105 as well as being supported on the top of the body 103 is a plate 107 of a circular or other suitable shape, and on the lower end of the rod 105 may be an anti-friction bearing 108 which is spaced below the body and its blades 104. The cutter 102 is employed in conjunction with the machine by being removably mounted under the saw 53, and to accomplish this a threaded opening, or recess is provided through the saw 53 and in the free end of the stud 52 of the saw. The cutter will thereby depend downwardly from the saw of the machine so that by arranging the plate 107 with the saw 53 to rest on top of the cutting block 14 as well as arranging the anti-friction bearing 108 in movable contact with the side of the cutting block the blades 104 of the cutter will be revolved to bevel the edge of the cutting block when the machine is operated as above explained.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. In a resurfacing machine, the combination with a frame composed of hinged wings adapted to be swung toward and from each other including means to raise and lower each of the wings to various heights, of a vertical shaft journaled in the frame, a circumferentially rotatable and longitudinally movable arm on the vertical shaft, having manually operative means to adjust the arm upwardly and downwardly on the vertical shaft, a casing removably mounted on the arm so as to be manually movable in unison with the arm, an upright shaft journaled in the casing, a saw on the shaft, and means for driving the upright shaft.

2. In a resurfacing machine, the combination with a frame composed of hinged wings adapted to be swung toward and from each other, including means to raise and lower each of the wings to various heights, of a toothed vertical shaft journaled in the frame, a hinged sectional circumferentially rotatable and longitudinally movable arm on the vertical shaft, means coacting with the teeth of the shaft, operable to adjust the arm upwardly and downwardly on the shaft, a casing removably mounted on the sectional arm so as to be manually moved in unison with the arm, an upright shaft journaled in the casing, a saw on the upright shaft, and electrically operative means for driving the upright shaft.

3. In a resurfacing machine, the combination with a frame composed of hinged wings adapted to be swung toward and from each other, including means to raise and lower each of the wings to various heights, of a hinged sectional arm with means mounting the arm on the frame so that the arm is circumferentially rotatable and longitudinally movable, a casing removably and adjustably mounted on the sectional arm so as to be manually moved in unison with the arm, an upright shaft journaled in the casing, a saw on the upright shaft, and an electrically operative motor in the casing for driving the upright shaft.

4. In a resurfacing machine, the combination with a frame composed of hinged wings adapted to be swung toward and from each other, including means to raise and lower each of the wings to various heights, and a vertical shaft journaled in the frame, of a circumferentially rotatable and longitudinally movable arm on the vertical shaft, having means to adjust the arm upwardly and downwardly on the vertical shaft, a casing with an upright shaft, a saw on the upright shaft, means for driving the upright shaft, and means detachably mounting the casing to said arm as well as to adjust the casing on an incline relative to the arm.

5. In a resurfacing machine, the combination with a frame composed of hinged wings adapted to be swung toward and from each other, including means to raise and lower each of the wings to various heights, of a hinged sectional circumferentially rotatable and longitudinally movable arm on the frame, a casing removably mounted on the sectional arm so as to be manually moved in unison with the arm, an upright shaft journaled in the casing, a saw on the upright shaft, means for driving the upright shaft, and means to adjust the casing on an incline relative to the arm.

6. In a resurfacing machine, the combination with a frame composed of hinged wings adapted to be swung toward and from each other, including means to raise and lower each of the wings to various heights, of a vertical shaft journaled in the frame, a hinged sectional circumferentially rotatable and longitudinally movable arm on the vertical shaft, manually operative means to adjust the sectional arm upwardly and downwardly on the vertical shaft, a casing removably mounted on the sectional arm so as to be manually moved in unison with the arm, an upright shaft journaled in the casing, a saw on the upright shaft, an electrically operative motor in the casing for driving the upright shaft, and means to adjust the casing on an incline relative to the arm.

7. In a resurfacing machine, the combination with a vertical shaft, a circumferentially rotatable and longitudinally movable arm on the vertical shaft, including means to adjust the arm upwardly and downwardly on the vertical shaft, a casing removably mounted on the arm so as to be manually moved in unison with the arm, an upright shaft journaled in the casing, a saw on the upright shaft, and means for driving the upright shaft, of a frame composed of hinged wings in which the vertical shaft is journaled, means to adjust the casing on an incline relative to the arm, and a fender removably mounted on the casing above the saw.

8. In a resurfacing machine, the combination with a vertical shaft, a hinged sectional arm on the vertical shaft, including a casing removably mounted on the sectional arm so as to be manually moved in unison with the arm, of a frame composed of hinged wings in which the vertical shaft is journaled, an upright shaft journaled in the casing, a saw on the upright shaft, means for driving the upright shaft, means to adjust the casing on an incline relative to the arm, and a fender removably mounted on the casing above the saw.

9. In a resurfacing machine, the combination with a frame composed of hinged wings adapted to be swung toward and from each other, including means to raise and lower each of the wings to various heights, and a vertical shaft journaled in the frame, of a hinged sectional circumferentially rotatable and longitudinally movable arm on the vertical shaft, a casing removably mounted on the sectional arm so as to be manually moved in unison with the arm, an upright shaft journaled in the casing, means for driving the upright shaft, means to adjust the casing on an incline relative to the arm, a fender removably mounted on the casing, and a cutter adapted to be removably mounted on the shaft for beveling the edge of a block.

10. In a resurfacing machine, the combination with a frame composed of hinged wings adapted to be swung toward and from each other, means to raise and lower each of the wings to various heights, of a vertical shaft journaled and also adjustable in the frame, a hinged sectional arm on the vertical shaft, a casing removably mounted on the sectional arm so as to be manually moved in unison with the arm, an upright shaft journaled in the casing, an electrically operative motor in the casing for driving the upright shaft, means to adjust the casing on an incline relative to the arm, a fender removably mounted on the casing, and a cutter adapted to be removably mounted on the shaft for beveling the edge of a block.

This specification signed and witnessed this 9th day of March, A. D. 1917.

SEWARD W. MANN.

Witnesses:
  GEORGE F. BENTLEY,
  V. M. RUMPH.